(12) United States Patent
Mitani et al.

(10) Patent No.: US 7,782,176 B2
(45) Date of Patent: Aug. 24, 2010

(54) METHOD FOR INFORMATION DISPLAY, MOBILE INFORMATION APPARATUS, AND CONTACTLESS COMMUNICATION DEVICE

(75) Inventors: Yukihiro Mitani, Tokyo (JP); Atsushi Wada, Tokyo (JP); Akinori Ohno, Tokyo (JP); Hideki Nagayanagi, Tokyo (JP); Shoji Kezuka, Tokyo (JP)

(73) Assignee: Vodafone Group PLC, Newbury (GB)

( * ) Notice: Subject to any disclaimer, the term of this patent is extended or adjusted under 35 U.S.C. 154(b) by 1074 days.

(21) Appl. No.: 11/453,249

(22) Filed: Jun. 15, 2006

(65) Prior Publication Data

US 2006/0279410 A1    Dec. 14, 2006

Related U.S. Application Data

(63) Continuation of application No. PCT/JP2004/018912, filed on Dec. 17, 2004.

(30) Foreign Application Priority Data

Dec. 19, 2003  (JP)  .............................. 2003-421775
Dec. 26, 2003  (JP)  .............................. 2003-433546

(51) Int. Cl.
*H04Q 5/22*     (2006.01)
*G08B 29/00*    (2006.01)
(52) U.S. Cl. .................... 340/10.6; 340/505; 455/41.2; 455/558
(58) Field of Classification Search ............... 340/10.6, 340/505; 455/41.2, 558; 235/382, 451, 375, 235/379, 380; 379/111, 112, 114; 395/186
See application file for complete search history.

(56) References Cited

U.S. PATENT DOCUMENTS 4,643,845 A * 2/1987 Omote et al. ............... 376/261
5,815,658 A * 9/1998 Kuriyama .................... 726/20
5,884,271 A * 3/1999 Pitroda ......................... 705/1
6,070,794 A * 6/2000 Niwata et al. ............... 235/380

(Continued)

FOREIGN PATENT DOCUMENTS

JP    2001-195335    7/2001

(Continued)

*Primary Examiner*—Brian A Zimmerman
*Assistant Examiner*—Nam V Nguyen
(74) *Attorney, Agent, or Firm*—Kratz, Quintos & Hanson, LLP

(57) ABSTRACT

A mobile information apparatus 10 acquires the display information which is stored in the display area 72, which is secured for using at the time of displaying on the display section by the mobile information apparatus 10, in the storage section 34 of the contactless communication device 30. In this case, in the display area 72, display information which can improve convenience for a user is stored. The display information which is stored includes information such as a result of editing a content of communication performed by the contactless communication, a function performed by the contactless communication by the contactless communication device 30, and an issuer of such function. Then, based on the display information which is acquired, the information of the contactless communication device 30 is displayed on the display section. Therefore, it is possible to display on the display section of the mobile information apparatus 10 in which the contactless communication device 30 is installed, the information of the contactless communication device 30 which can improve the convenience for the user.

14 Claims, 11 Drawing Sheets

U.S. PATENT DOCUMENTS

| | | | |
|---|---|---|---|
| 6,128,604 A * | 10/2000 | Sakamaki et al. | 705/41 |
| 6,456,859 B1 * | 9/2002 | Desblancs et al. | 455/558 |
| 7,195,174 B2 * | 3/2007 | Kogawa | 235/492 |
| 7,240,846 B2 * | 7/2007 | Arisawa et al. | 235/492 |

FOREIGN PATENT DOCUMENTS

| | | |
|---|---|---|
| JP | 2001-317955 | 11/2001 |
| JP | 2002-83322 | 3/2002 |
| JP | 2002-281181 | 9/2002 |

* cited by examiner

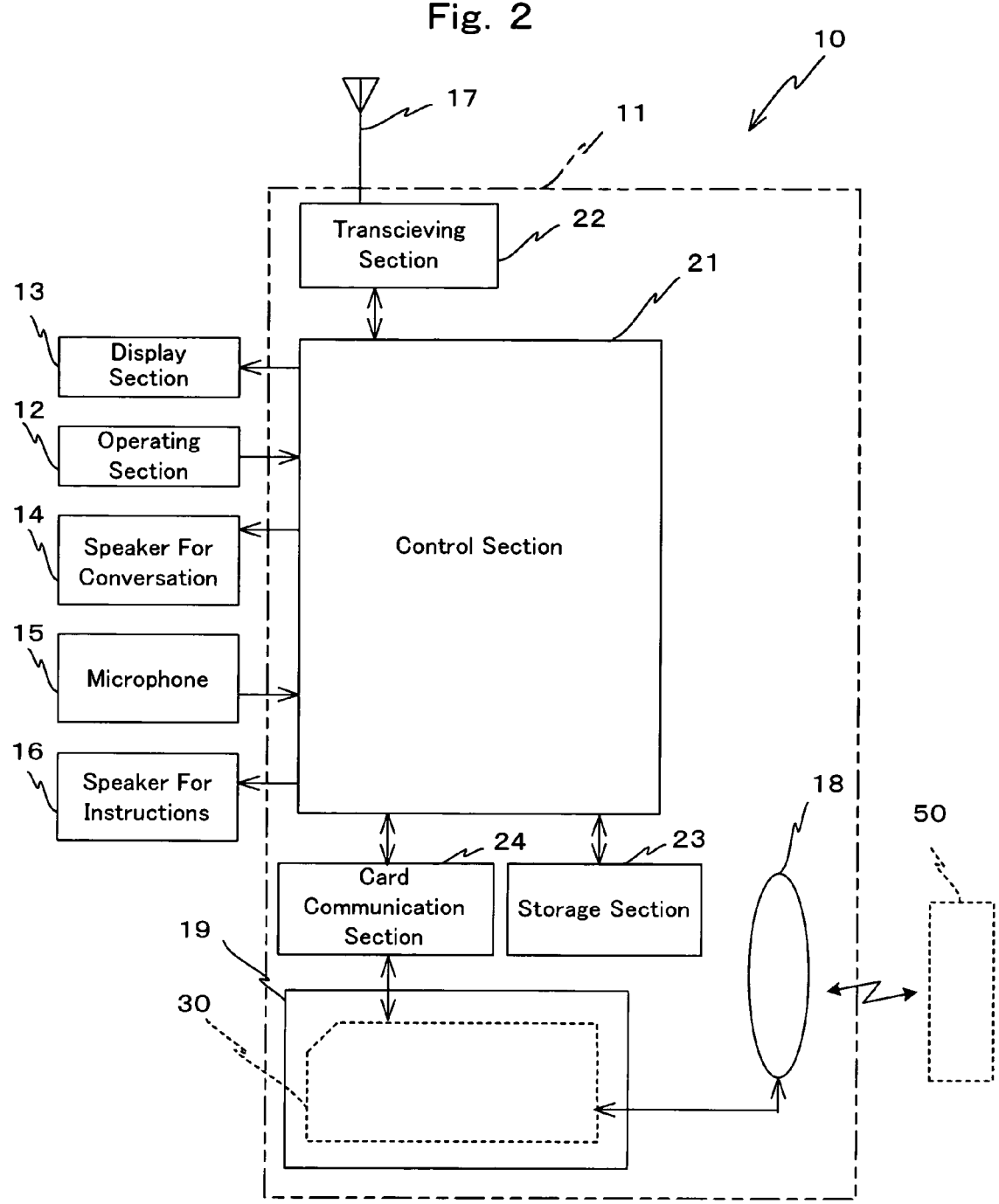

METHOD FOR INFORMATION DISPLAY, MOBILE INFORMATION APPARATUS, AND CONTACTLESS COMMUNICATION DEVICE

RELATED APPLICATION

This a continuation application of the international patent application No. PCT/JP2004/018912 filed with Application date: Dec. 17, 2004. The present application is based on, and claims priorities from, J.P. Application 2003-421775, filed on Dec. 19, 2003, J.P., and Application 2003-433546, filed on Dec. 26, 2003, J.P. the disclosure of which is hereby incorporated by reference herein its entirety.

BACKGROUND OF THE INVENTION

The present invention relates to a method for information display, a mobile information apparatus, and a contactless communication device, and in particular, to a method for information display of displaying on a display section of the mobile information apparatus, information of the contactless communication device which can perform communication with the mobile information apparatus, via a wired path, a mobile information apparatus which uses the method for information display, and a contactless communication device which can be used at a time of using the method for information display, by the mobile information apparatus.

BACKGROUND ART

Mobile information apparatuses such as a mobile terminal have been hitherto used widely. There has been a remarkable improvement in functions and performance of such mobile information apparatuses. A mobile information apparatus which is equipped with a contactless communication device which performs a contactless communication as well as a function of a so-called IC card used in various fields recently, in addition to a call function and a transcieving function of E-mail, which are essential functions as the mobile information apparatus have made debut. Examples of such contactless communication device are a device in the form of a card such as the so-called IC card, and which is installable in the mobile information apparatus (refer to Japanese Patent Application Laid-open Publication No. 2001-223631, for example), and a device which is built-in and fixed in the mobile information apparatus (refer to Japanese Patent Application Laid-open Publication No. 2003-85466, for example).

In such contactless communication devices, an IC chip such as a CPU (central processing unit) chip and a memory chip is built-in. Such contactless communication devices, due to a high degree of security are on a way to perform an important function related to an individual, such as storing information which is not supposed to be known by others, like a settlement of payment of electronic money for example. Moreover, it has been possible to equip one contactless communication device with a plurality of important functions related to the individual.

In such contactless communication devices, a contactless communication device having a mechanism which enables to perform a communication with the mobile information apparatus via a wired path, as well as to perform a communication with an external reader-writer for the contactless communication by using the contactless communication, is normal. The mobile information apparatus is provided with an antenna for the contactless communication device which is installed, to perform the contactless communication, apart from an antenna for performing a communication with a base station.

SUMMARY OF THE INVENTION

[Problems to be Solved by the Invention]

As mentioned above, a contactless communication device which is installable in a mobile information apparatus has been proposed. However, in the mobile information apparatus in which the contactless communication device is installed, in a case of performing a communication with an external reader-writer, by the contactless communication (hereinafter, called as "contactless communication) function of the contactless communication device, a control system (such a CPU) in the mobile information apparatus is not involved. Therefore, a communication content of the contactless communication cannot be recorded in a storage section which is managed by the control system of the mobile information apparatus, and the communication content is recorded only in the contactless communication device. When the contactless communication device has a plurality of functions (such as a railway-ticket checking system and point card, for example), the communication content of such contactless communication device is recorded upon classifying according to the functions.

Therefore, when a user makes an attempt to check the communication content of the contactless communication device by displaying on a display section of the mobile information apparatus, it is necessary to install in the mobile communication terminal, a computer program for displaying upon reading a content of recording of the contactless communication device. Several such computer programs have also been proposed. However, any of such computer programs has been a general purpose computer program which can perform operations in various modes at a time of reading and displaying the content of recording of the contactless communication device. Therefore, for reading and displaying the targeted content of recording (such as a content of a transaction made recently by the contactless communication, and a function of the contactless communication device) several operations by the user were necessary.

Furthermore, in a case in which the contactless communication device has a plurality of functions, when the user desires to check the content of a latest transaction, even more complex operation is necessary. In other words, the user, first of all, figures out as to what function was the transaction, which was performed recently by the contactless communication. Further, an operation for checking the content of the transaction for each function the contactless communication device has, being different the user has to remember operations for checking as many number of functions.

Moreover, in the conventional technology mentioned above, nothing has been proposed regarding an automatic display of information useful for the user, such as information of as to by whom the contactless communication device is issued, and as to which functions the contactless communication device has. Therefore, the user could not check points such as, as to which functions the contactless communication device has, unless the user performed the complex operations.

Furthermore, when the contactless communication device is a card device which is detachable from the mobile information apparatus, even if the card device is lost, or replaced by a malicious person, such situations could not be detected easily and quickly. As a result, measures to stop the functions immediately can not be taken. Therefore, there was a possibility of the user sustaining a loss.

The present invention is made in view of the abovementioned circumstances, and it is an object of the present invention to provide a method for information display of displaying information of the contactless communication device which can improve the convenience of the user, on a display section of the mobile information apparatus in which the contactless communication device is installed.

Moreover, another object of the present invention is to provide a mobile information apparatus which can display the information of the installed contactless communication device, by using the method for information display of the present invention mentioned above.

Furthermore, still another object of the present invention is to provide the contactless communication device which can be used when the mobile information apparatus of the present invention mentioned above uses the method for information display of the present invention mentioned above.

[Means for Solving Problem]

A method for information display of the present invention is a method for displaying on a display section of a mobile information apparatus, information of a contactless communication device which performs communication with the mobile information apparatus, via a wired path, and comprises steps of acquiring display information which is stored in a display area which is secured for using at a time of displaying by the mobile information apparatus, in a storage section of the contactless communication device, and displaying by the mobile information apparatus, the information of the contactless communication device based on the display information.

In this method for information display, at the step of acquiring display information, the mobile information apparatus acquires display information stored in a display area which is secured for using at a time of displaying on a display section by the mobile information apparatus, in a storage section of the contactless communication device. In this case, in the display area, display information which can improve convenience for the user is stored. The display information which is stored includes information such as a result of editing such as extracting latest information from content of communication performed by the contactless communication, a function performed by the contactless communication by the contactless communication device, and an issuer of such function. Such display information is stored in the display area at the time when the function performed by the contactless communication by the contactless communication device is issued, or stored in the display area after the editing of a result of communication by the contactless communication.

Next, at the step of displaying, the mobile information apparatus displays on the display section, the information of the contactless communication device, based on the display information which is acquired. Therefore, according to the method for information display of the present invention, the information of the contactless communication device which can improve the convenience for the user, can be displayed on the display section of the mobile information apparatus in which that contactless communication device is installed.

In the present invention, the display information can be let to be information of at least one transaction which is made recently by the contactless communication, and the step of acquiring the display information can be let to be executed according to a display request by the user of the mobile information apparatus. Adopting the information of at least one transaction, which is made recently by the contactless communication as the display information, and executing the step of acquiring the display information upon waiting for a display request of the user, depends on the following findings achieved by research and development by inventors of the present invention.

Chances of checking a content of transaction made with the contactless communication device installed in a mobile communication terminal apparatus by the user of the mobile information apparatus are mainly divided into two. One of the two is a real checking by the display of entire content of transactions made till that time, or content of several transactions and not all transaction. The other is a simple checking by displaying the content of transactions of at the most several transactions which are made recently, such as checking the content of transaction immediately after the transaction is made. In such simple checking, even if it is a case of the contactless communication device having a plurality of application functions, it is desirable that the content of transactions which are made recently is displayed in a mode in which the plurality of application functions are traversed, and not a display for each application function.

As mentioned above, by letting the information of at least one transaction which is made recently by the contactless communication, to be the display information, and by executing the step of acquiring the display information according to the display request by the user of the mobile information apparatus, it is possible to respond to a request for a simple search, by the user of the mobile information apparatus. In other words, at a time of checking the content of the transaction which is made recently with the contactless communication device, it is possible to improve the convenience for the user.

In this case, a display request by the user of the mobile information apparatus can be let to be a one-time operation of a predetermined key in the mobile information apparatus. In this case, with the one-time operation of the predetermined key, in other words, with a simple operation of a so-called one-touch operation, it is possible to display the content of the transactions made recently, and to improve the convenience for the user. Note that, a key may be provided for the exclusive use as the predetermined key, or one key from among a plurality of keys which is provided as a standard in the mobile information apparatus may be allocated appropriately to be the predetermined key according to an operation condition of the mobile information apparatus.

Moreover, in the information display apparatus of the present invention, the display information can be let to be issue information which includes information of an issuer of a function which is performed by the contactless communication by the contactless communication device. In this case, it is possible to display easily and accurately, issued-card information related to the contactless communication device which can improve the convenience for the user.

In this case, the step of acquiring display information can include steps of acquiring by the mobile information apparatus authentication information for display which is stored in a first predetermined area, via the wired path, authenticating for display of authentication by the mobile information apparatus about displaying which is stored in a second predetermined area in the display area, in a specific display area of the display section on which only a basic processing section for realizing a basic function of the mobile information apparatus can be displayed, based on the authentication information for display, and acquiring issue information via the wired path by the mobile information apparatus, when an authentication result at the step of authenticating the display information is affirmative. At the step of displaying, the issue information can be displayed in the specific display area.

In this case, first of all, at the step of acquiring the authentication information, the mobile information apparatus in which the contactless communication device is installed, acquires by a contact communication, the authentication information for display which is stored in the first predetermined area in the display area of the contactless communication device. Next, at the step of authenticating for display, the mobile information apparatus performs authentication about displaying the issue information which includes the information of the issuer of the contactless communication device and which is stored in the second predetermined area in the display section, in the specific display area of the display section on which only the basic processing section for performing the basic function of the mobile information apparatus can be displayed, based on the authentication information for display which is acquired. Note that, the first predetermined area and the second predetermined area in the contactless communication device are areas which cannot be read and altered easily by a person other than a person who has authorized in advance.

When the authentication result is affirmative, at the step of acquiring issue information, the mobile information apparatus acquires the issue information which is stored in the second predetermined area of the display area. Moreover, at the step of displaying, the mobile information apparatus displays the issue information in the specific display area of the display section.

Therefore, it is possible to display easily and accurately the issue information related to the contactless communication device which is installed in the mobile information apparatus. As a result of this, the user can check easily the accurate issue information of the contactless communication device which is installed in the mobile information apparatus. Therefore, the convenience for the user is improved.

The issue information may be let to include function information of the contactless communication device. In this case, in addition to the information of the issuer, information about function included in the contactless communication device is displayed. Therefore, detail issue information related to the contactless communication device installed in the mobile information apparatus can be displayed.

When the function information of the contactless communication device is included in the issue information, at the step of displaying the issue information, the information of the issuer and the function information can be let to be displayed one after another, or the information of the issuer and the function information can be let to be displayed in a pair. When the information of the issuer and the function information are let to be displayed one after another, even when a size of the specific display area is insufficient for the information to be displayed, the issue information which is required to be displayed can be displayed in a mode which the user can check easily.

Moreover, the information of the issuer can be let to be at least one icon-information. In this case, the issue information is displayed in the specific display area, in a mode called icon which is easily viewable. Therefore, the user can check easily the accurate issued-card information of the card device installed in the mobile information apparatus.

The mobile information apparatus of the present invention can perform communication with the contactless communication device, via the wired path, and comprises a display section, and a means for acquiring display information which acquires display information which is stored in a display area, which is secured for using at a time of displaying on the display section, in a storage section of the contactless communication device.

In this mobile information apparatus, the means for acquiring display information acquires the display information which is stored in the display area, which is secured for using at the time of displaying on the display section by the mobile information apparatus, in the storage section of the contactless communication device. Moreover, based on the display information which is acquired, the information of the contactless communication device is displayed on the display section.

In other words, in the mobile information apparatus of the present invention, it is possible to display the information of the contactless communication device by using the method for information display of the present invention described above. Therefore, according to the mobile information apparatus of the present invention, it is possible to display on the display section, the information of the contactless communication device which can improve the convenience for the user.

In the mobile information apparatus of the present invention, the display information can be let to be at least one transaction which is made recently by the contactless communication. In this case, the convenience for the user can be improved at the time of checking the content of transaction which is made recently with respect to the contactless communication device which is installed.

Moreover, in the mobile information apparatus of the present invention, the display information can be let to be the issue information which includes the information of issuer of the function which is performed by the contactless communication by the contactless communication device. In this case, the issued-card information related to the contactless communication device which can improve the convenience for the user can be displayed easily and accurately.

In this case, the means for acquiring display information can be let to have a structure comprising a means for acquiring authentication information for display which acquires authentication information for display which is stored in the first predetermined area in the display area, via the wire path, an authenticating means for display which authenticates about the issue information which is stored in the second predetermined area in the display area, in the specified display area of the display section, on which only the basic processing section for performing the basic function can be displayed, based on the authentication information for display which is acquired, and an issue information acquiring means which acquires the issue information stored in the second predetermined area in the display area, when the authentication result of the authenticating means is affirmative.

In this case, the means for acquiring authentication information for display acquires the authentication information for display which is stored in the first predetermined area in the display area, of the contactless communication device. Next, the authenticating means for display authenticates about displaying, the issue information of the contactless communication device, which is stored in the second predetermined area in the display area, in the specific display area of the display section in which only the basic processing section for performing the basic function can be displayed, based on the authentication information for display, which is acquired. Note that, the first predetermined area and the second predetermined area in the contactless communication device are areas which cannot be read and altered easily by a person other than a person who is authorized in advance.

When the authentication result is affirmative, the issue information acquiring means acquires by the contact communication, the issue information of the contactless communication device, which is stored in the second predetermined area in the display area. Further, the issue information is displayed on the specific display area of the display section of the mobile information apparatus.

Therefore, the issue information related to the contactless communication device which is installed can be displayed easily and accurately.

In the mobile information apparatus of the present invention, a structure of the mobile information apparatus can be let to comprise further, a wireless communication section for performing the wireless communication with a base station of a mobile communication network. In other words, the mobile information apparatus of the present invention can be let to be a mobile communication terminal apparatus such as a mobile terminal apparatus.

The contactless communication device of the present invention can communicate with the mobile information apparatus via the wired path, and comprises the storage section which includes the display area secured for using at the time of display on the display section of the mobile information apparatus, and a communication-control processing section which performs a processing of a communication and the contactless communication with the mobile information apparatus.

In this contactless communication apparatus, the display information which can improve the convenience for the user can be stored in the display area. The display information includes information such as the result of editing of the content of communication performed by the contactless communication, the function performed by the contactless communication by the contactless communication device, and the issuer of such function. The display information is sent back to the mobile information apparatus via the wired path, in response to a request for the display information from the mobile information apparatus, via the wired path.

Therefore, according to the contactless communication device of the present invention, by coordinating with the mobile information apparatus of the present invention, it is possible to execute the method for information display of the present invention, and to improve the convenience for the user.

In the contactless communication device of the present invention, the communication processing section can be let to have a structure comprising a transaction recording means which records in the display area, information of at least one transaction which is made recently by the contactless communication. In this case, the transaction recording means records in the display area the information of at least one transaction which is made recently by the contactless communication. When number of transactions exceeding a capacity of the display area are made with the contactless communication device, updating of the recording content is performed, in which information of old transactions is deleted from the predetermined area, and information of new transactions is recorded in the predetermined area.

Thus, with the transactions performed by the contactless communication with respect to the wireless communication device while updating appropriately are recorded in the display area, when the wireless communication device receives from the user of the mobile information apparatus in which the contactless communication device is installed, a request for reading a content of a transaction which is made recently, together with a request for display of the content of the transaction which is made recently, the communication-control processing section sends the content to the mobile information apparatus.

Therefore, according to the contactless communication device of the present invention, by coordinating with the movable communication terminal apparatus of the present invention, it is possible to improve the convenience for the user at the time of checking the content of the transaction which is made recently and recorded in the contactless communication device.

Moreover, in the contactless communication device according to the present invention, the display area can be let to have a structure which comprises the first predetermined area for storing the authentication information for display which shows that the display on the specific display area of the display section of the mobile information apparatus, on which only the basic processing section for performing the basic function of the mobile information apparatus can be displayed, is permitted, and the second predetermined area in which the issue information which is displayed on the specific display area, and which includes the information of issuer of the function which is performed by the contactless communication, is stored, when authenticated to be the mobile information apparatus, by the authentication information for display which is stored in the first predetermined area.

In this case, the mobile information apparatus can read the authentication information for display by making an access to the first predetermined area. Moreover, the mobile information apparatus, based on the authentication information for display which is read, can authenticate about displaying on the specific display area of the display section of the mobile information apparatus, on which only the basic processing section for performing the basic function of the mobile information apparatus can be displayed. When the result of this authentication is affirmative, the mobile information apparatus, by making an access to the second predetermined area, can read the issued-card information which is to be displayed in the specific display area. The first predetermined area and the second predetermined area in the card device are areas which cannot be read and altered by a person other than a person who is authorized in advance.

Therefore, the contactless communication device of the present invention can be let to be a card device which is detachable from the mobile information apparatus, and also let to be disposed to be fixed inside mobile information apparatus. In this case, "disposed to be fixed" means that the contactless communication device is installed in the mobile information apparatus such that the contactless communication device is not detachable from the mobile information apparatus, and also includes a case in which the contactless communication device is installed in an IC chip such that the contactless communication device is incorporated into a function section for the mobile information apparatus.

[Effect of the Invention]

Thus, according to a method for information display of the present invention, there is shown an effect that information of a contactless communication device which can improve convenience for a user can be displayed on a display section of a mobile information apparatus in which the contactless communication device is installed.

Moreover, according to the mobile information apparatus and the contactless communication device of the present invention, there is shown an effect that the convenience for the user can be improved by combining the mobile information apparatus and the contactless communication device, since the combination enables to execute the method for information display of the present invention.

BRIEF DESCRIPTION OF DRAWINGS

FIG. 2 is a functional block diagram for describing an internal structure of the mobile terminal apparatus in FIG. 1;

DETAILED DESCRIPTION

Figure 1A:
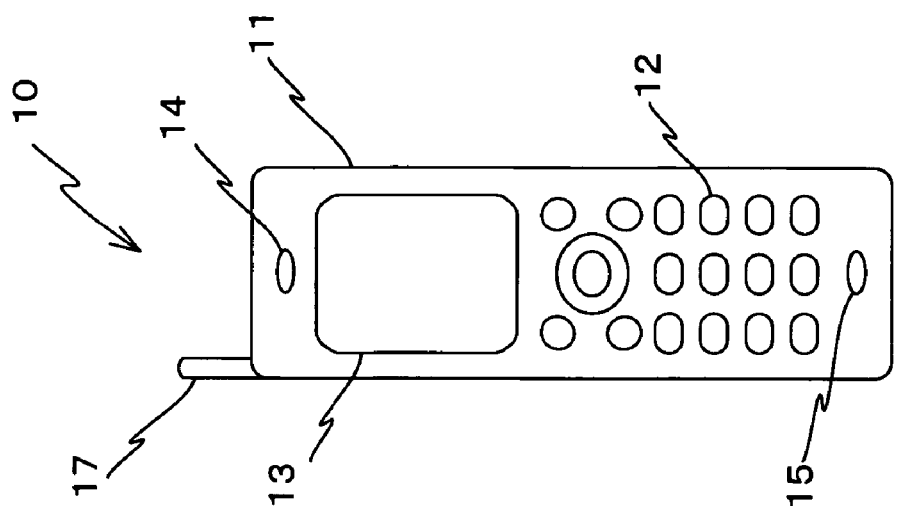
FIG. 1A is a diagram showing schematically a front-side external view of a mobile terminal apparatus according to an embodiment.

An embodiment of the present invention will be described below while referring to FIG. 1A to FIG. 10. In the diagrams from FIG. 1A to FIG. 10, the same reference numeral is assigned to the same or equivalent components, and repeated description is omitted.

Figure 1B:
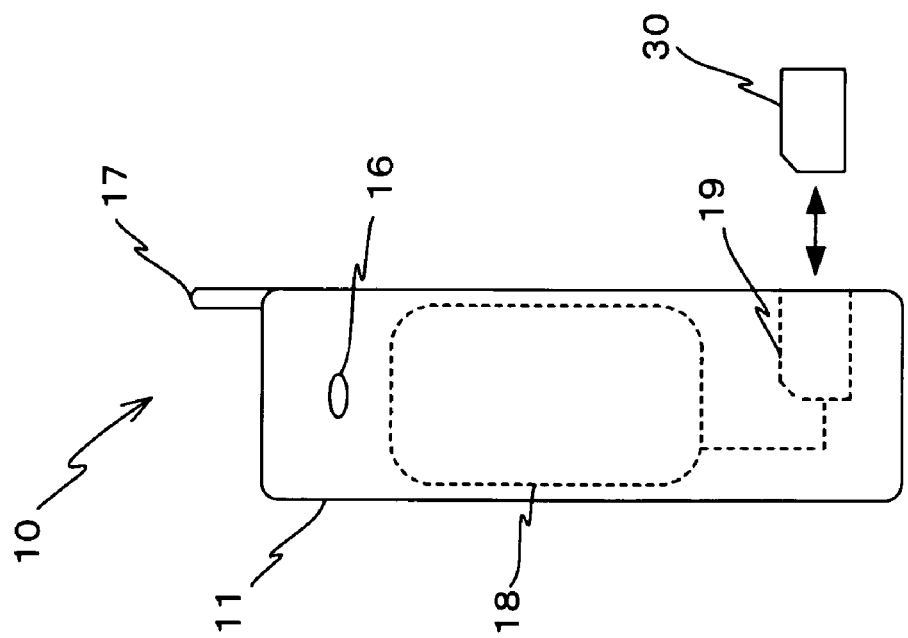
FIG. 1B is a diagram showing schematically a rear-side external view of the mobile terminal apparatus according to the embodiment.

In FIG. 1A and FIG. 1B, an external structure of a mobile terminal apparatus 10 which is a mobile information apparatus is shown schematically. In this case, in FIG. 1A, a front view of an external structure of the mobile terminal apparatus 10 is shown, and in FIG. 1B, a rear view of an external structure of the mobile terminal apparatus is shown.

As it is shown comprehensively in FIG. 1A and FIG. 1B, the mobile terminal apparatus 10 includes (a) a mobile terminal main body 11, (b) an operating section 12, (c) a display section 13, (d) a speaker for conversation 14, (e) a microphone 15, (f) a speaker for instructions 16, and (g) an antenna 17. The operating section 12 includes a numerical key pad for inputting a telephone number, and function keys for inputting to a control section 21 various instructions, such as switching of an operation mode. The display section 13 includes a liquid crystal display unit which displays operation instructions, operation condition, and a message received. The speaker for conversation 14 reproduces an aural signal which is transmitted from a communication counterpart at the time of conversation. The microphone 15 is for inputting a sound at the time of listening, and for inputting the aural signal at the time of conversation. The speaker for instructions 16 is for generating a ring tone and an instruction tone. The antenna 17 is for receiving a wireless signal between the mobile terminal apparatus 10 and a base station.

In this case, one of the function keys in the operating section 12 is a display-instruction key (hereinafter, "transaction display key") of a content of the latest transaction, in a stand-by state. By a one-touch operation of pressing this transaction display key, a user can give an instruction for displaying the content of the latest transaction.

Moreover, as shown by a dotted line in FIG. 1B, the mobile terminal apparatus 10 includes in the mobile terminal main body 11, (h) an antenna 18 and (j) an IC card accommodating section 19. The antenna 18 is used for a contactless communication of an IC card 30. The IC card 30 can be inserted into and extracted from the IC card accommodating section 19. In this case, a terminal for connecting with a terminal for contactless communication 32 (refer to FIG. 5) of the IC card 30 which will be described later, is formed in the IC card accommodating section 19. The terminal for connecting with the terminal for contactless communication 32, and the antenna 18 are connected electrically. Note that, in FIG. 1A, to avoid the diagram from becoming complicated, the antenna 18 and the IC card accommodating section 19 are omitted.

Inside of the mobile terminal main body 11, as shown in FIG. 2, in addition to the antenna 18 and the IC card accommodating section 19 described above, there are provided, (i) a control section 21, (ii) a transcieving section 22, (iii) a storage section 23, and (iv) a card communication section 24. The control section 21 performs an integrated control of an operation of the entire mobile terminal apparatus 10. The transcieving section 22 performs transmitting and receiving of a wireless signal to and from a base station, via the antenna 17. The storage section 23 includes a read only memory (ROM) device and a random access memory (RAM) device which store various data. The card communication section 24 performs contact communication with the IC card 30 which is accommodated in the IC card accommodating section 19.

Figure 3:
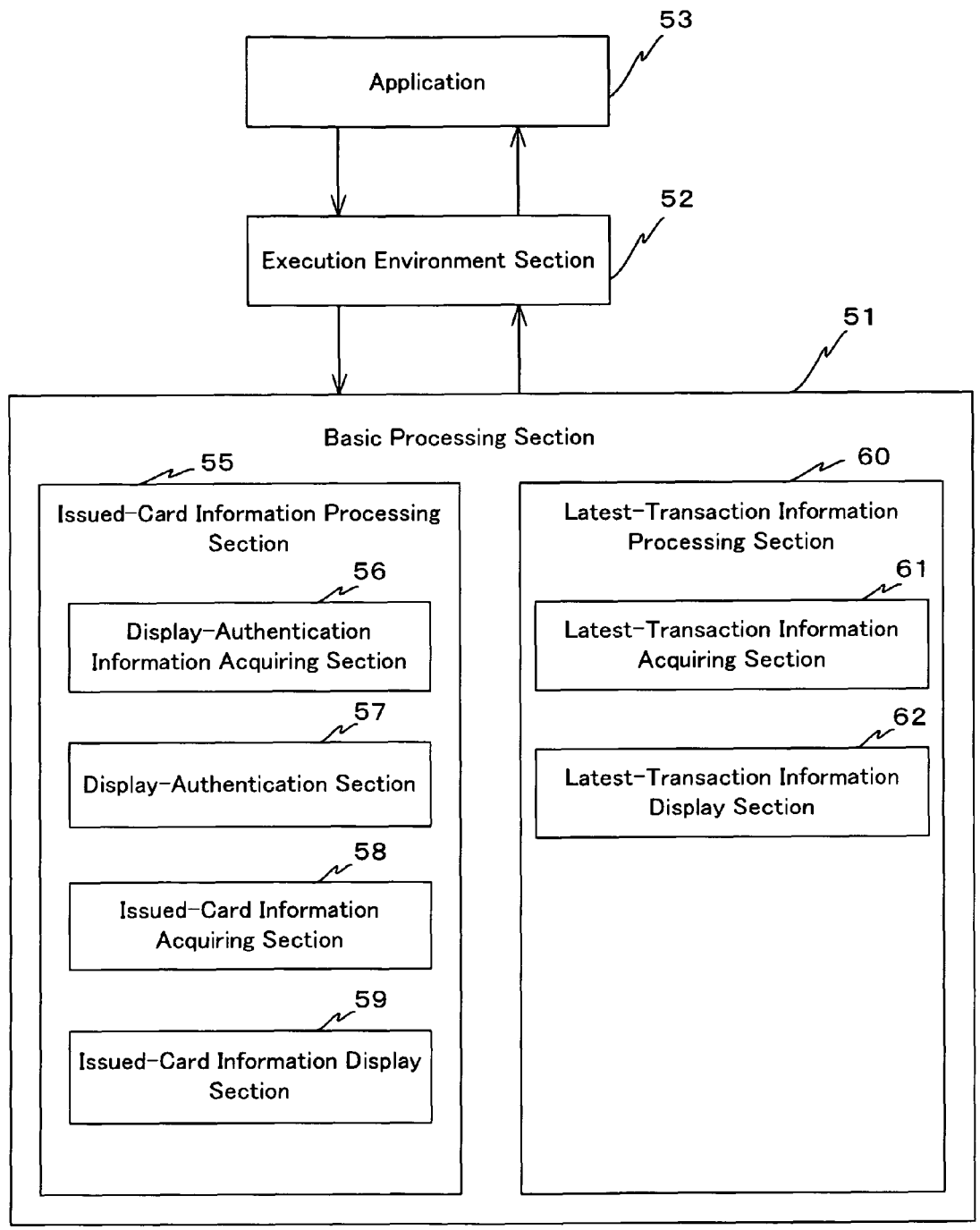
FIG. 3 is a diagram for describing a structure of software which is executed by a control section.

The control section 21 includes units such as a central processing unit (CPU) and a digital signal processor (DSP), and for realizing general functions of a mobile terminal, various data processing as well as operation control of other structural elements described above, are performed. A software configuration of a computer program which is executed in the control section 21 is as shown in FIG. 3.

In other words, the software in the control section 21 includes (i) a basic processing section 51, (ii) an application 53, and (iii) an execution environment section 52. The basic processing section 51 realizes a conversation function and a mail function which are basic functions as the mobile terminal, as well as performs a control of various hardware resources. The application 53 is for providing to the user various contents such as games. The execution environment section 52 is positioned between the basic processing section 51 and the application 53, and provides an execution environment for the application 53. In this case, the application 53 is sometimes pre-installed before shipping from a factory, but generally is installed after downloading via the transcieving section 22 from a server which performs various management and services in a network to which the mobile terminal apparatus belongs, by an operation of the operating section 12 by the user.

The basic processing section 51 includes an issued-card information processing section 55, and a latest-transaction information processing section 60. The issued-card information processing section 55 performs processing of issued-card information related to the IC card 30. The latest-transaction information processing section 60 performs processing of information of the latest-transaction by the contactless communication with the IC card 30.

In this case, the issued-card information processing section 55 includes (i) a display-authentication information acquiring section 56, (ii) a display authentication section 57, (iii) an issued-card information acquiring section 58, and (iv) an issued-card information display section 59. The display-authentication information acquiring section 56 acquires authentication information for display which is stored in the IC card 30 via the card communication section 24, when the IC card 30 is installed. The display authentication section 57 authenticates issued-card information which is stored in the IC card 30, about displaying in system display areas SDA 1 and SDA 2, which will be described later. The issued-card information acquiring section 58 acquires issued-card information which includes information of issuer which is stored in a second predetermined area 39 of the IC card 30. The issued-card information display section 59 displays the issued-card information of the IC card in the system display areas SDA 1 and SDA 2.

Moreover, the latest-transaction information processing section 60 includes a latest-transaction information acquiring section 61, and a latest-transaction information display section 62. In this case, the latest-transaction information acquiring section 61 has a function of making a request for reading transaction information stored in a latest-transaction recording section 74 (refer to FIG. 6) of the IC card 30 which will be described later, to the IC card 30 via the card communication section 24, according to an instruction for display of a content of the latest transaction by the key operation of the operation section 12 by the user, and a function of acquiring a content recorded in the latest-transaction recording section 74 which is notified from the IC card 30 in response to the request for reading the transaction information. Moreover, the latest-transaction information acquiring section 61 has a function of acquiring detail information of a transaction, from a normally used area 71 (refer to FIG. 5) which will be described later, in the IC card 30, based on the content recorded in the latest-transaction recording section 74, which is acquired.

The basic processing section 51 and the execution environment section 52 are installed in the mobile terminal apparatus 10 before shipping. The basic processing section 51 and the execution environment section 52 can not be modified by any one other than someone who has been authorized in advance, such as a mobile terminal company and a mobile terminal manufacturer.

Information such as a request, a response, and an event generation, which are associated with the application 53, can be interchanged appropriately between the basic processing section 51 and the execution environment section 52. Moreover, between the execution environment section 32 and the application 53, various requests from the application 53 are notified to the execution environment section 52, as well as the response and the event generation from the execution environment section 52, are notified. In other words, the execution environment section 52 is a set of computer programs which provides a software resource for executing applications such as a command conversion between the application 53 and the basic processing section 51, and management of the application 53.

Figure 4:
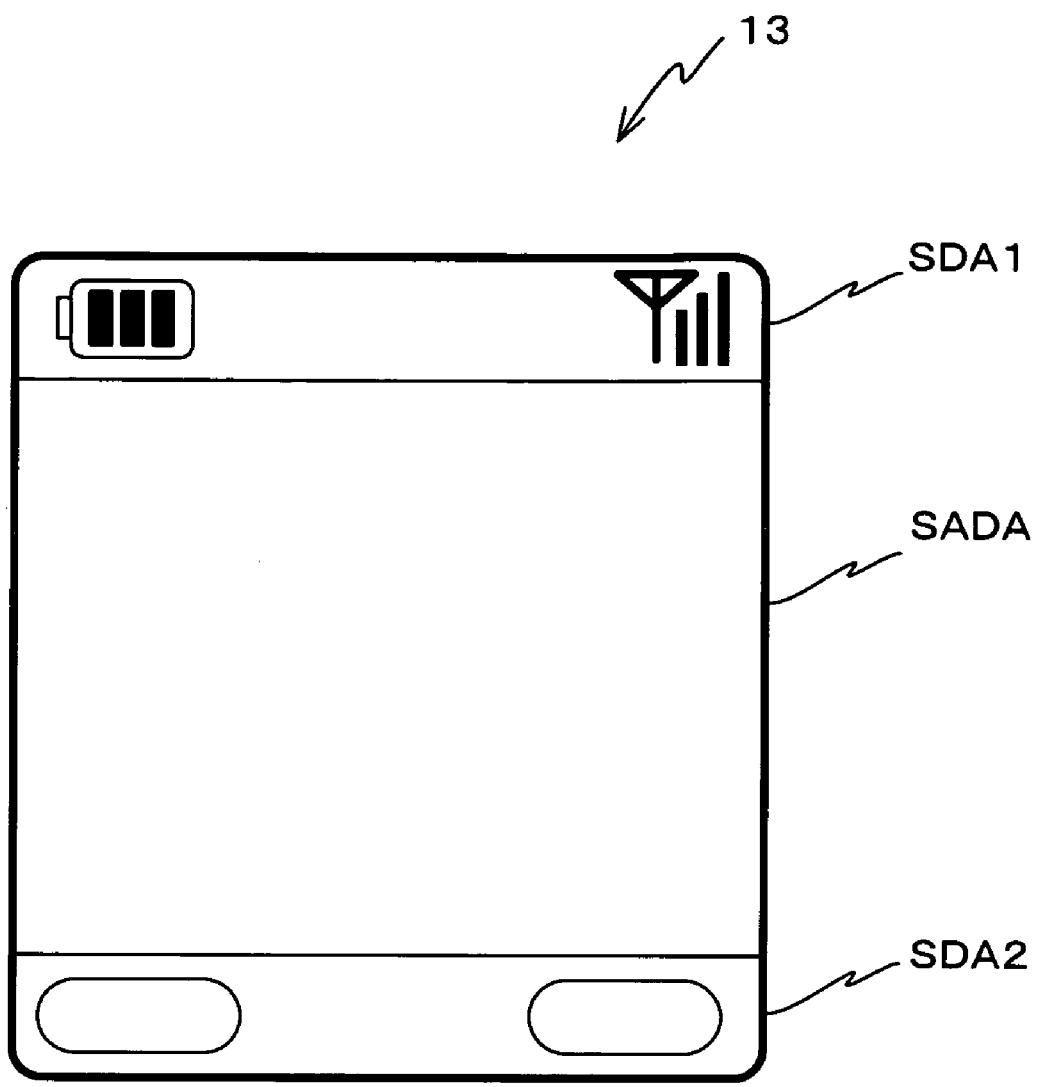
FIG. 4 is a diagram for describing an area structure of a display section in the mobile terminal apparatus in FIG. 1A and FIG. 1B.

The display area of the display section 13, as shown in FIG. 4, is divided into the system display areas SDA 1 and SDA 2 in which only the basic processing section 51 can determine a display content, and a shared display area SADA in which both the basic processing section 51 and the application 53 can determine the display content. In other words, the basic processing section 51 can determine the display content for the entire display area of the display section 13, but the application 53 can determine the display content only for the shared display area SADA.

Figure 5:
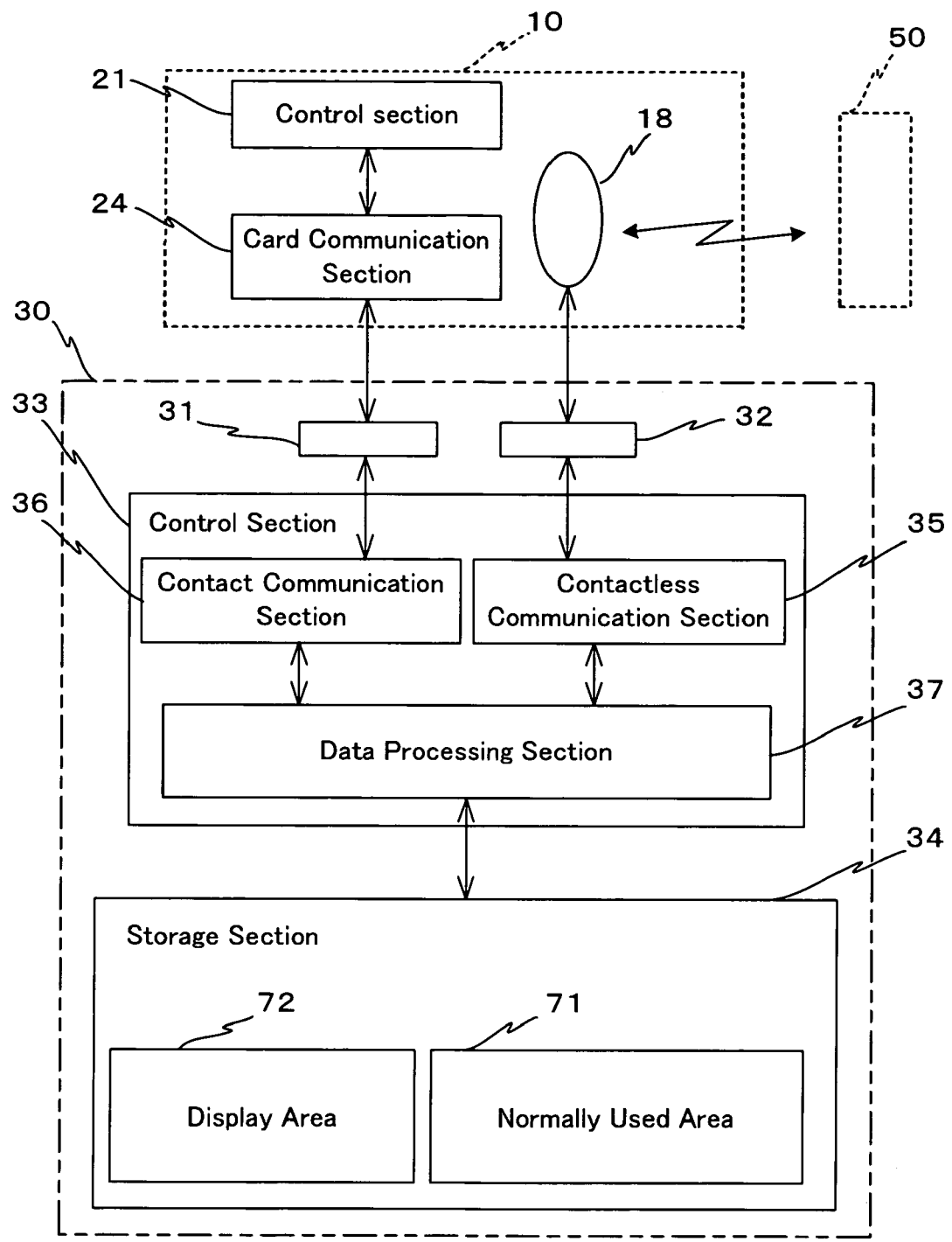
FIG. 5 is a functional block diagram showing a structure of an IC card in FIG. 1A and FIG. 1B.

The IC card 30, as shown in FIG. 5, includes (a) a control section 33, and (b) a storage section 34. The control section 33 performs a control of the contact communication via a terminal for contact communication 31 and the contactless communication via a terminal for contactless communication 32, as well as an integrated control of the entire IC card 30, such as reading in the storage section 34. The storage section 34 stores data in the IC card 30. In this embodiment, a standardized terminal in an SDIO (Secure Digital Input/Output) card is adopted as the terminal for contact communication 31 in the IC card 30. Moreover, the IC card 30, from a point of view of the contactless communication, is an RFID (Radio Frequency-Identification) card.

The control section 33 includes (i) a contactless communication section 35, (ii) a contact communication section 36, and (iii) a data processing section 37. The contactless communication section 35 performs control of a contactless communication operation with a reader-writer 50. The contact communication section 36 performs a control of the contact communication with the mobile terminal apparatus 10. The data processing section 37 performs data processing which includes reading and writing of data from the storage section 34.

The storage section 34 includes the normally used area 71, and a display area 72. In this case, information of a transaction by the contactless communication is stored one after another for each function, in the normally used area 71.

Figure 6:
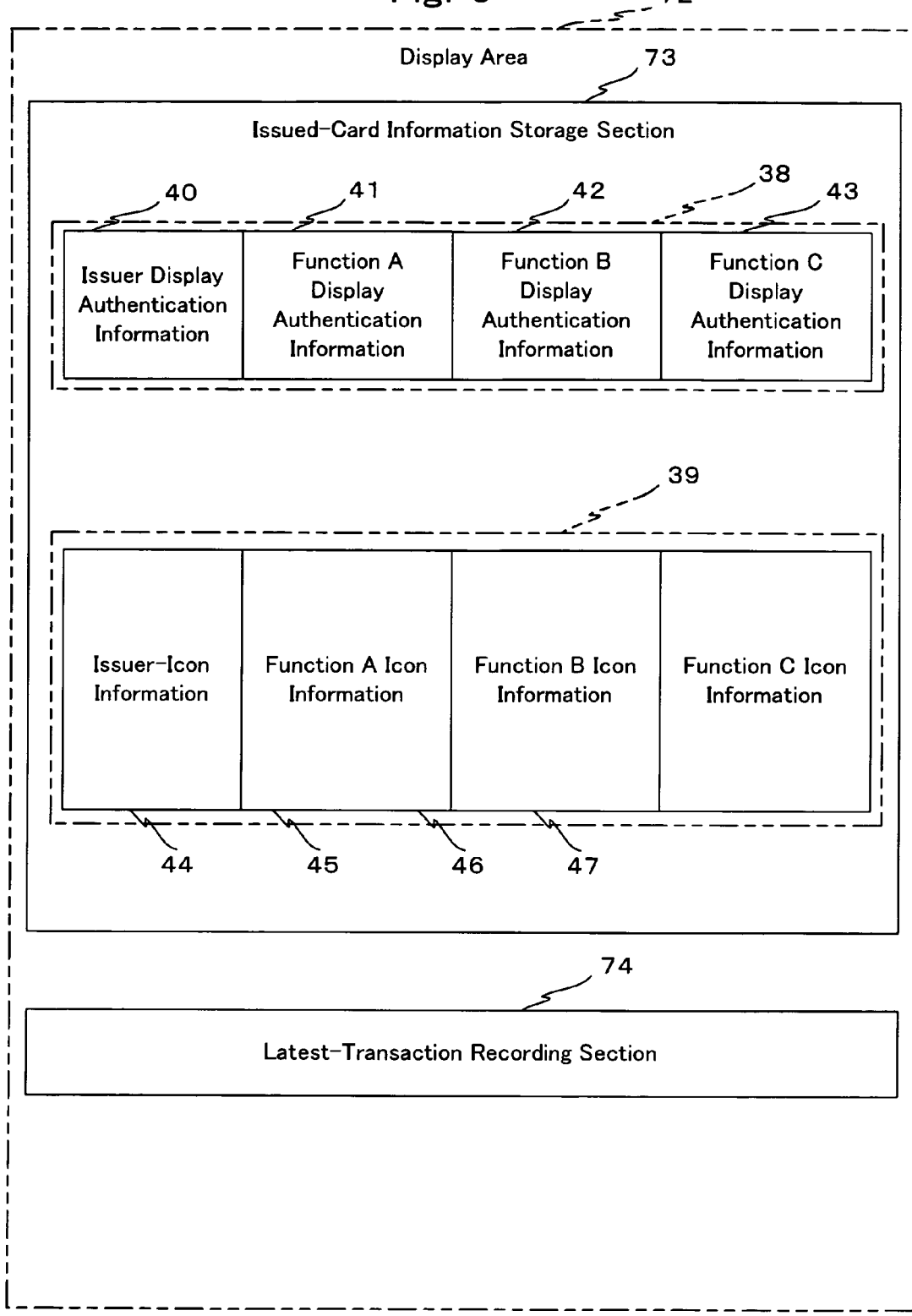
FIG. 6 is a diagram for describing a structure inside a display area.

The display area 72, as shown in FIG. 6, includes an issued-card information storage section 73 and the latest-transaction recording section 74. Information used for displaying issued-card information is stored in the issued-card information storage section 73. Information of the latest transaction is stored in the latest-transaction recording section 74.

In this case, the issued-card information storage section 73 includes a first predetermined area 38 in which authentication information for display is saved, and the second predetermined area 39 in which the issued-card information is saved. Note that, the first predetermined area 38 and the second predetermined area 39 are areas which cannot be altered easily by any one other than someone who has been authorized in advance.

In the first predetermined area 38, (i) issuer display authentication information 40, (ii) function A display authentication information 41, (iii) function B display authentication information 42, and (iv) function C display authentication information 43 are stored. The issuer display authentication information 40 is for displaying issuer-icon information 44 which will be described later, in the system display areas SDA 1 and SDA 2. The function A display authentication information 41 is for displaying function A icon information 45 which will be described later, in the system display areas SDA 1 and SDA 2. The function B display authentication information 42 is for displaying function B icon information 46 which will be described later, in the system display areas SDA 1 and SDA 2. The function C display authentication information 43 is for displaying function C icon information 47 which will be described later, in the system display areas SDA 1 and SDA 2.

Note that, the authentication information for display is issued from a person who performs a management of the system display areas SDA 1 and SDA 2, to a person who performs a management of each function of the card or the card issuer, and is information for authorizing the display in the system display areas SDA 1 and SDA 2. Such authentication information for display is written in the first predetermined area 38 of the IC card 30 at the time of issuing the card or at the time of adding a card function.

Moreover, in the second predetermined area 39, (i) the issuer icon information 44, (ii) the function A icon information 45, (iii) the function B icon information 46, and (iv) the function C icon information 47 are stored. In the issuer icon information 44, the information of issuer is stored as icon information. In the function A icon information, function information of a function A is stored as the icon information.

In the function B icon information 46, function information of a function B is stored as the icon information. In the function C icon information 47, function information of a function C is stored as the icon information.

The reader-writer 50 shown in FIG. 2 and FIG. 5 is a transcieving unit which performs the contactless communication with the IC card 30 via the antenna 18.

An operation of display of information related to the IC card 30 in the mobile terminal apparatus 10 will be described below with reference to mainly FIG. 7 to FIG. 10. In the following description, the card issuer is a railway company R (abbreviated as "railway R" in FIG. 8 and FIG. 10), the function A is a season ticket function which is issued by the railway company R, the function B is a prepaid-fare railway ticket checking function issued by the railway company R, the function C is a credit-card function issued by the railway company R.

<Operation of Display of Issued-card Information>

First of all, an operation of display of issued-card information will be described below by referring mainly to FIG. 7 and FIG. 8.

Figure 7:
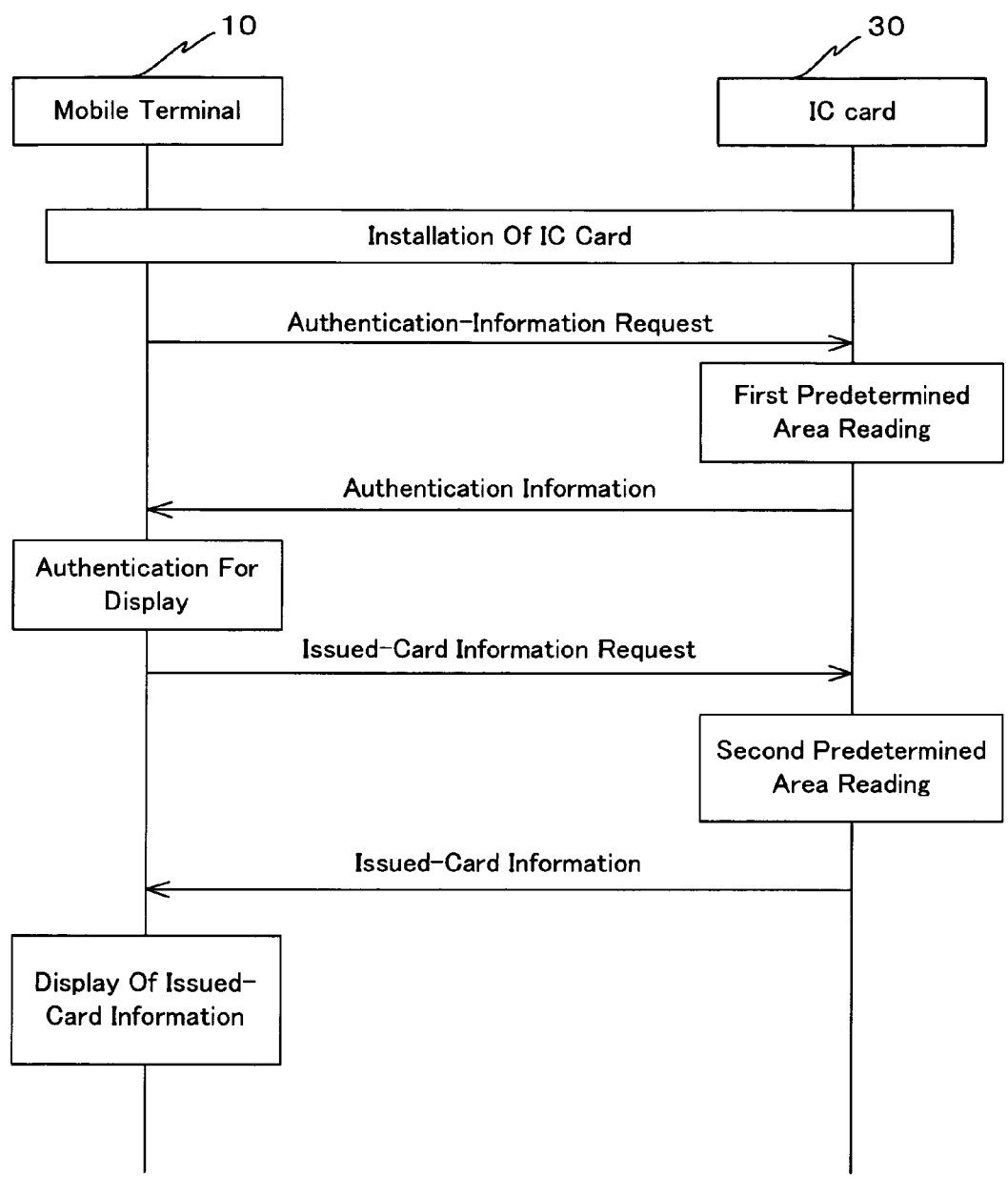
FIG. 7 is a sequence diagram for describing a display process of issued-card information in the mobile terminal apparatus in FIG. 1.

As shown in FIG. 7, as the user of the mobile terminal apparatus 10 installs the IC card 30 in the IC card accommodating section 19 of the mobile terminal apparatus 10, the control section 21 identifies that the IC card 30 has been installed. Then, the display-authentication information acquiring section 56 transmits an authentication-information request for requesting the authentication information stored in the first predetermined area 38 of the IC card 30, towards the IC card 30 via the card communication section 24.

The data processing section 37 of the IC card 30 which has received the authentication information request via the terminal for contact communication 31 and the contact communication section 36, reads the authentication information for display namely, the issuer display authentication information 40, the function A display authentication information 41, the function B display authentication information 42, and the function C display authentication information 43 saved in the first predetermined area 38, and transmits to the mobile terminal apparatus 10 via the contact communication section 36 and the terminal for contact communication 31.

The display-authentication information acquiring section 56 of the mobile terminal apparatus 10, which has received the four authentication information for display via the card communication section 24, saves the four authentication information for display received, in the storage section 23, and notifies a destination to save to the display-authentication section 57.

The display-authentication section 57 to which the destination to save of the four authentication information for display is notified, reads the four authentication information for display from the storage section 23, and for each of the four information, performs authentication for displaying the issued-card information in the system display areas SDA 1 and SDA 2. Then, the display-authentication section 57 notifies an authentication result of the four authentication information for display to the issued-card information acquiring section 58. Note that, only issued-card information for which the authentication result is affirmative is displayed in the system display area SDA 1. The following description is made assuming that the authentication result of all the four authentication information for display is affirmative.

The issued-card information acquiring section 58 which is notified that the authentication result for all the four authentication information for display is affirmative, transmits an issued-card information request for requesting the issued-card information which is stored in the second predetermined area 39, to the IC card 30 via the card communication section 24.

The data processing section 37 which has received the authentication-information request via the terminal for contact communication 31 and the contact communication section 36, reads four issued-card information saved in the second predetermined area 39, namely the issuer icon information 44, the function A icon information 45, the function B icon information 46, and the function C icon information 47, and transmits to the mobile terminal apparatus 10 via the contact communication section 36 and the terminal for contact communication 31.

The issued-card information acquiring section 58 of the mobile terminal apparatus 10 which has received the issued-card information via the card communication section 24, saves in the storage section 23 the four issued-card information received, and notifies the destination to save to the issued-card information display section 59.

Figure 8:
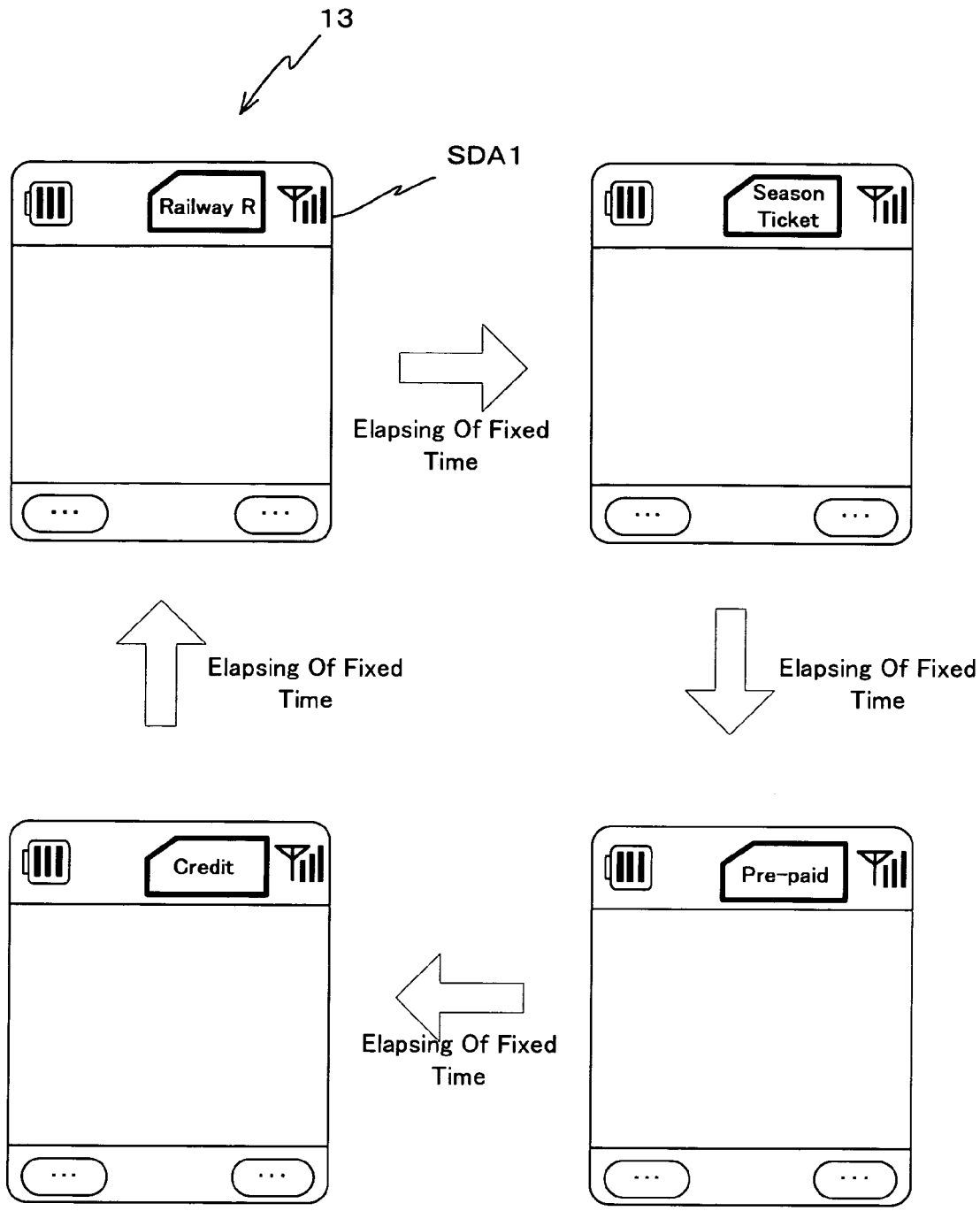
FIG. 8 is a diagram showing a display example of the issued-card information in the mobile terminal apparatus in FIG. 1.

The issued-card information display section 59 to which the destination to save of the four issued-card information is notified, displays on the display section 13, as shown in FIG. 8. In other words, four types of icons of the issuer-icon information 44 (railway R), the function A (season ticket function) icon information 45, the function B (pre-paid fare railway ticket checking function) icon information 46, and the function C (credit-card function) icon information 47, are displayed one after another at a regular interval of time in the system display area SDA 1 of the display section 13.

<Operation of Displaying Latest-transaction Information>

Next, an operation of displaying the latest-transaction information will be described by referring mainly to FIG. 9 and FIG. 10. In the following description, it is assumed that the latest transaction is related to a pre-paid fare railway ticket checking service provided by the railway company R, and that the IC card 30 can be used as a card for a pre-paid fare railway ticket checking system. Moreover, the IC card 30 is assumed to be installed already in the mobile terminal apparatus 10 of the user.

Figure 9:
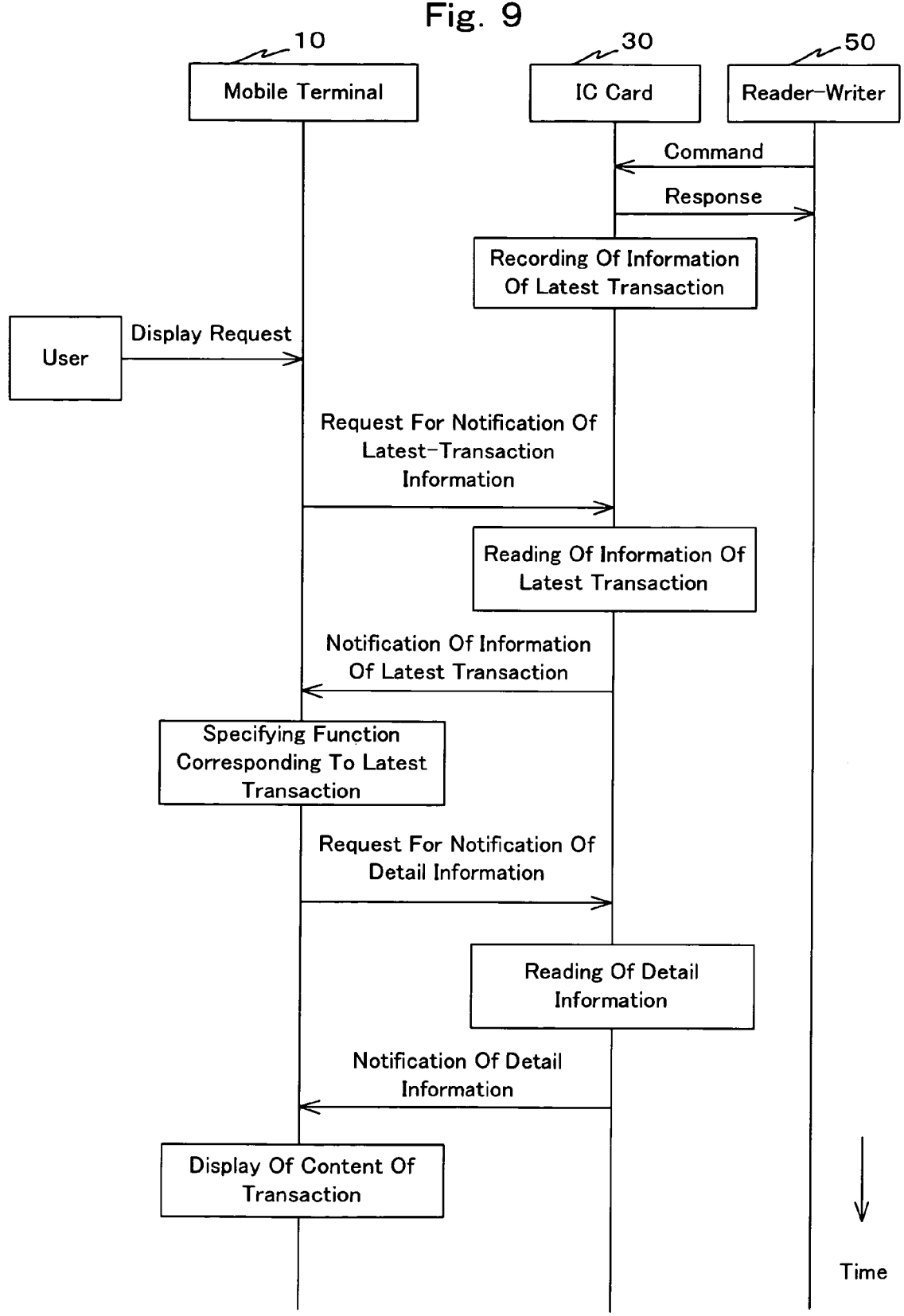
FIG. 9 is a sequence diagram for describing a content-display process of a transaction by a contactless communication in the mobile terminal apparatus in FIG. 1.
Figure 10:
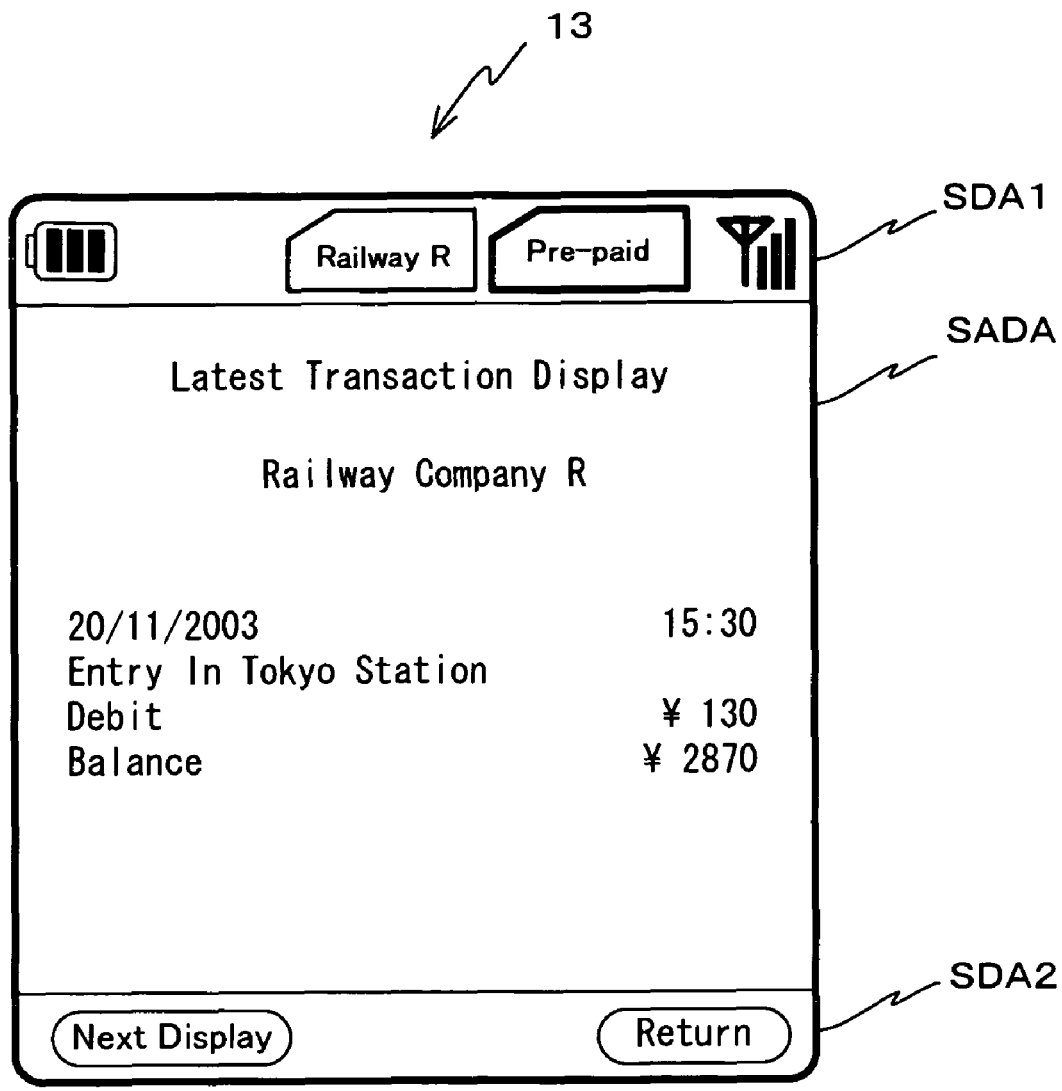
FIG. 10 is a diagram showing a display example of a content of a transaction by the contactless communication in the mobile terminal apparatus in FIG. 1.

As shown in FIG. 9, the user of the mobile terminal apparatus 10 takes the mobile terminal apparatus 10 sufficiently close to the reader-writer 50 which is installed in a ticket checking machine at a time of entering a ticket wicket of the railway company R. Then, the reader-writer 50 which has identified the presence of the IC card 30, transmits by the contactless communication a processing command such as a reading request, a writing request, or a request other than the reading request and the writing request. The command is received in the contactless communication section 35 of the IC card 30, via the antenna 18 and the terminal for contactless communication 32 of the mobile terminal apparatus 10. The contactless communication section 35 checks whether or not the contactless communication is normal, and passes data of the command to the data processing section 37.

The data processing section 37, according to the content of the command and the content of the storage section 34 of the IC card 30, performs on the storage section 34, a process such as a reading process, a writing process, or a process other than the reading process and the writing process, and passes data of a response according to that result, to the contactless communication section 35. The contactless communication section 35 which has received the data of this response, transmits the response by the contactless communication, via the terminal for contactless communication 32, and the antenna 18 in the mobile terminal apparatus 10. The response is received in the reader-writer 50. Such an interchange of command and response, in other words, a transaction, is repeated for the required number of times. In this embodiment, a transaction of debiting an amount of fare is repeated for the required number of times. Further, information related to the transaction such as a time and date of entry, a name of a railway station entered, an amount debited, and a balance is stored in the normally used area 71 in the storage section 34 of the IC card 30.

On the other hand, at the time of transaction, the data processing section 37 in the control section 33 of the IC card 30 records a part of the information of the transaction in the latest-transaction recording section 74 in the display area 72 of the storage section 34. In this embodiment, a name of a service provider who provides the service, and a distinction of an entry and an exit are recorded in the latest-transaction recording section 74. At this time, information of the previous transaction in the latest-transaction recording section 74 is deleted. Further, in this case, the name of the service provider (in other words, railway company R), and a point that it is an entry in a ticket checking service which is information of the latest transaction is recorded in the latest-transaction recording section 74.

Then, when a request for the display of the content of the latest transaction is made by the user of the mobile terminal apparatus 10 by pressing a transaction-display key in the operating section 12 of the mobile terminal apparatus 10, the following operation is executed. First of all, the latest-transaction information acquiring section 61 in the basic processing section 51 in the mobile terminal apparatus 10 transmits a request for notification of latest-transaction information to the IC card 30, for reading the recording of the latest-transaction information in the IC card 30 via the card communication section 24. The request for notification of latest-transaction information is received in the contact communication section 36 via the terminal for contact communication 31. The contact communication section 36 which has received the request for notification of the latest-transaction information, checks whether or not the communication is normal, and passes data of the request for notification of the latest-transaction information to the data processing section 37.

The data processing section 37 which has received the data of the request for notification of the latest-transaction information, reads the content of recording related to the latest transaction, from the latest-transaction recording section 74, in other words, reads that it was the railway company R, and that it was the entry. Next, the data processing section 37 passes as data of notification of latest-transaction information, to the contact communication section 36. The contact communication section 36 which has received the data of notification of latest-transaction information transmits the notification of information of the latest transaction to the mobile terminal apparatus 30 via the terminal for contact communication 31.

In the mobile terminal apparatus 10, the latest-transaction information acquiring section 61 receives the latest-transaction information by the notification of the latest-transaction information via the card communication section 24. Then, the latest-transaction information acquiring section 61 specifies a function of the IC card 30, which corresponds to the latest-transaction, based on the information of the railway company R, and that it is an entry, which is the information acquired of the latest-transaction.

Next, the latest-transaction information acquiring section 61, similarly as in a case of the request for notification of the latest-transaction information described above, makes a request to the IC card 30 for detail information which is stored in the normally used area 71, via the terminal for contact communication 31 and the contact communication section 36 in the IC card 30, and the card communication section 24. The data processing section 37 of the IC card 30 which has received this request, reads the detail information recorded in the normally used area 71. The detail information includes information such as the time and date of entry, the name of the railway station entered, the amount debited, and the balance. Further, the data processing section 37, similarly as notifying the transaction information, notifies to the latest-transaction information acquiring section 61, the detail information, in other words, the time and date of entry, the name of the railway station entered, the amount debited, and the balance, via the contact communication section 36, the terminal for contact communication 31, and the card communication section 24 in the mobile terminal apparatus 10.

The latest-transaction information receiving section 61 which has received this notification, notifies to the latest-transaction information display section 62, information from the detail information of the latest-transaction and the content recorded in the latest-transaction recording section 74, which is acquired. The information from the detail information include a name of the railway company R, the time and date of entry, the name of the railway station entered, a point that it is an entry, the amount debited, number of points debited, and a balance of number of points. Further, the latest-transaction information display section 62 displays on the display section 13, the content of the latest transaction. An example of a display of the content of the latest transaction is shown in FIG. 10.

Thus, in this embodiment, as the IC card 30 is installed in the mobile terminal apparatus 10, the mobile terminal apparatus 10 acquires the authentication information for display from the IC card 30, and performs authentication for displaying the issued-card information. When the result of the authentication is affirmative, the mobile terminal apparatus 10 acquires from the IC card 30, icon information corresponding to the information of issuer included in the issued-card information, and displays in the system display areas SDA 1 and SDA 2 of the display section 13. Therefore, according to this embodiment, the user can check easily and accurately that the IC card 30 issued by the railway company is installed in the mobile terminal apparatus 10, without performing a particular operation.

Moreover, in this embodiment, for a plurality of functions in addition to the information of issuer of the IC card 30 installed in the mobile terminal apparatus 10, information of each function is displayed one after another at regular interval, in the system display areas SDA 1 and SDA 2. Therefore, the user, without performing a particular operation, can check as to what type of functions are installed in the IC card 30 which is installed, as well as can let the system display areas SDA 1 and SDA 2 which are used for displaying the issued-card information of the IC card 30, to be the minimum area. As a result, without reducing other icons etc. which are to be displayed in the system display areas SDA 1 and SDA 2, a plurality of icons in the IC card 30 which is provided with a plurality of functions, can be displayed in a mode which is easily identifiable by the user.

Moreover, in this embodiment, the issued-card information displayed in the system display areas SDA 1 and SDA 2 is let to be icon information. Therefore, the user can check easily and accurately, the issuer and the functions of the IC card 30 which is installed in the mobile terminal apparatus.

Moreover, in this embodiment, when the contactless transaction is performed with the IC card 30, information of the latest transaction from among the transactions by the contactless communication is stored in the latest-transaction recording section 74. Thus, when a request for display of the content of the latest transaction is made by the user of the mobile terminal apparatus 10 in which there is installed the IC card 30 with the information of the latest transactions by the contactless communication with the IC card 30 stored in the latest-transaction recording section 74 while updating appropriately the latest-transaction information, the mobile terminal apparatus 10 acquires the content recorded in the latest-transaction recording section 74. Further, in the mobile terminal apparatus 10, the content of the latest transaction is displayed on the display section 13 upon acquiring the detail information related to the appropriate latest transaction, based on the recorded content which is acquired.

Therefore, in this embodiment, the user can check by displaying on the display section 13 of the mobile terminal apparatus 10, the content of the transaction by contactless communication made recently with the IC card 30.

Moreover, in this embodiment, the request for display by the user of the mobile terminal apparatus 10 is let to be by a one-touch operation. Therefore, the content of the transaction made recently can be displayed by a simple operation.

Figure 11:
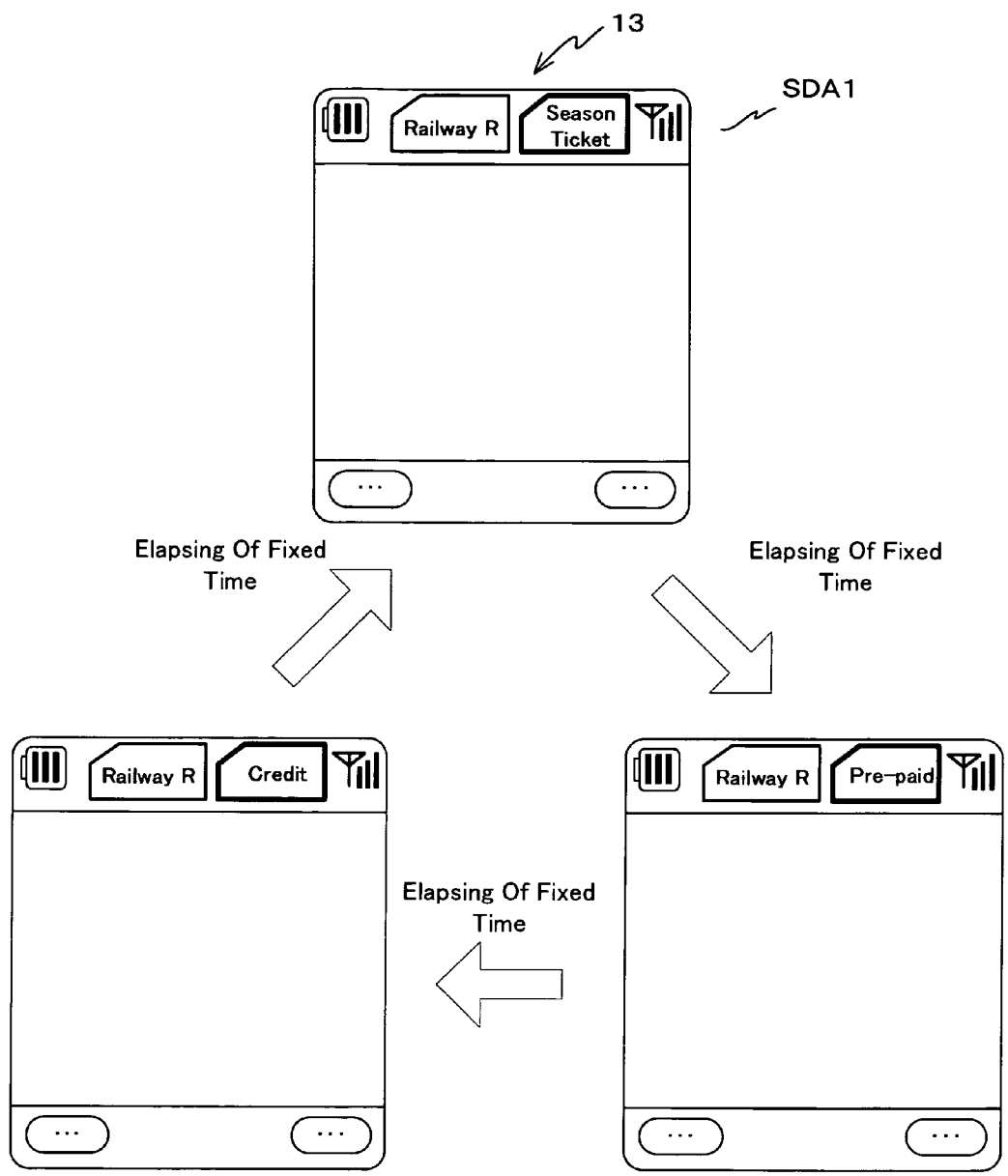
FIG. 11 is a diagram for describing a modified embodiment.

In the embodiment mentioned above, when there is a plurality of icon information which is to be displayed, the icon to be displayed is changed at a regular interval. Whereas, as shown in FIG. 11, it is also possible to display separately the icon information of the issuer of the card and the icon information of each function, and to change only the display of icon of each function. In other words, it is also possible to display upon changing the icon of the card function at regular interval, while letting the icon of the issuer of the card and the icon of the function to be a pair.

Moreover, in the embodiment mentioned above, a case in which the issued-card information includes the information of issuer and information of three functions is described. Whereas, the issued-card information may be let to include one or two function information, or more than four function information. Furthermore, the function information may not be there, and in this case, the issued-card information is displayed constantly in the system display area.

Furthermore, in the embodiment mentioned above, an example in which a railway company is let to be the card issuer is described. However, the card device may be a card device which is issued by a company other than the railway company.

Moreover, in the embodiment mentioned above, the number of information of issuer is let to be one. However, there may be a plurality of information of issuer. Even in such case, with a similar mode as in the mode shown in FIG. 8 or FIG. 11, the issued-card information is displayed in the system display area.

In the embodiment mentioned above, out of the system display areas SDA 1 and SDA 2 of the display section 13, the issued-card information is displayed in the system display area SDA 1. Whereas, the issued-card information may be displayed in the system display area SDA 2, or may be displayed upon distributing appropriately in both the system display areas SDA 1 and SDA 2. Furthermore, in a case where a mobile terminal apparatus includes a sub-display, at least a part of a display area of the sub-display can be used as a specific display area for displaying the issued-card information.

Moreover, in the embodiment mentioned above, the detail information is let to be acquired from the normally used area 71. However, without reading the detail information of the normally used area 71, only the information recorded in the latest-transaction recording section 74 can be let to be displayed on the display section 13, and the content of display can be let to be only simple information.

Moreover, the detail information in this embodiment can be added to the content which is recorded in the latest-transaction recording section 74.

Furthermore, in the embodiment mentioned above, the information of only the latest transaction is let to be recorded in the latest-transaction recording section 74, and only the content of the latest transaction is displayed. Whereas, a plurality of latest-transaction information can be let to be recorded in an area equivalent to the latest-transaction recording section 74, and content of the plurality of transaction can be let to be displayed one after other, or simultaneously.

In the embodiment mentioned above, an example of a railway ticket checking system is described for describing about the display of content of the latest transaction. However, a transaction in which other function is included in the IC card 30 can be let to be a target.

Moreover, in the embodiment mentioned above, a case in which the contactless communication device is an IC card is described. However, even if the contactless communication device is a card device other than the IC card, if the card device can perform communication with the mobile terminal apparatus via a wired path, and if the card device has a contactless communication function and can perform a transaction process, the present invention is applicable to such card device.

Furthermore, the contactless communication device may not be a device which is detachable from the mobile terminal apparatus, such as the IC card, and may be a device in the form of an IC chip which can be disposed to be fixed inside the mobile terminal apparatus. In this case, without allowing a standardized terminal such as a terminal in the SDIO card to interpose, the mobile terminal apparatus and the contactless communication device can perform communication via a wired path which includes a wiring pattern in a printed circuit board.

In the embodiment mentioned above, one of the function keys in the operating section 12 is let to function as a transaction display key in a stand-by state. Whereas, a key for an exclusive use as the transaction display key may be disposed in the operating section 12.

Moreover, in the embodiment mentioned above, the present invention is applied to the mobile terminal apparatus as a terminal with a contactless communication function. However, the present invention can also be applied to a mobile communication terminal apparatus other than the mobile terminal.

INDUSTRIAL APPLICABILITY

Thus, a method for information display of the present invention can be used for a display of information of a contactless communication device in a mobile information apparatus in which the contactless communication device is installed. Moreover, the mobile information apparatus of the present invention can be used as a mobile information apparatus which displays information of the contactless communication device which is installed therein. Moreover, the contactless communication device of the present invention can be installed in the mobile information apparatus and used as a contactless communication device which performs a contactless communication.

What is claimed is:

1. A method for information display relating to one or more contactless communications on one or more display areas of a mobile information apparatus comprising a contactless communications antenna, and an accommodating section for receiving an IC card arranged to perform contactless communications via the contactless communication antenna, comprising steps of:

receiving, via a wired connection, an IC card, said IC card comprising an IC card control section and an IC card storage section, said IC card arranged to perform contactless communications via the contactless communication antenna wherein the IC card storage section comprises a first predetermined area and a second predetermined area;

acquiring authentication information from a first predetermined area of an IC card storage section on said IC card and storing said authentication information in a mobile information storage section;

authenticating the received authentication information;

after a positive authentication, acquiring display information from a second predetermined area of the IC card storage section and storing said display information in said mobile information storage section; and displaying the display information in said one or more display areas in response to a display request, wherein the display information comprises information identifying the function of the IC card.

2. The method for information display according to claim 1, wherein the display information is information of at least one transaction which is made recently by a contactless communication, and the step of acquiring the display information is executed according to a display request by a user of the mobile information apparatus.

3. The method for information display according to claim 2, wherein the display request by the user of the mobile information apparatus is a one-time operation of a predetermined key in the mobile information apparatus.

4. The method for information display according to claim 1, wherein the display information is issue information which includes information of issuer of a function which is performed by the contactless communication by the contactless communication device.

5. The method for information display according to claim 4, wherein the step of displaying the display information in said one or more display areas includes steps of, displaying the issue information which is stored in a second predetermined area in a specific display area of the one or more display areas on which only a basic processing section for performing a basic function of the mobile information apparatus can be displayed, based on the authentication information for display.

6. The method for information display according to claim 4, wherein the issue information comprises function information of the contactless communication device.

7. The method for information display according to claim 6, wherein at the step of displaying, information of the IC card issuer and function information of the IC card are displayed one after another.

8. The method for information display according to claim 6, wherein at the step of displaying, information of the IC card issuer and function information of the IC card user are displayed in a pair.

9. The method for information display according to claim 4, wherein the issue information is at least one icon-information.

10. A mobile information apparatus comprising:

a mobile information storage section;

a contactless communication antenna;

a display comprising one or more display areas;

a means for receiving, via a wired connection, an IC card, said IC card comprising an IC card control section and an IC card storage section, said IC card arranged to perform contactless communications via the contactless communication antenna wherein the IC card storage section comprises a first predetermined area and a second predetermined area;

a first acquiring means for acquiring authentication information from the first predetermined area of said IC card storage section and storing said authentication information in said mobile information storage section;

an authentication means for authenticating the received authentication information;

a second acquiring means for acquiring display information from the second predetermined area and storing said display information in said mobile information storage section in response to a positive authentication; and a display means for displaying the display information in said one or more display areas in response to a display request, wherein the display information comprises information identifying the function of the IC card.

11. The mobile information apparatus according to claim 10, wherein the display information is information of at least one transaction which is made recently by a contactless communication.

12. The mobile information apparatus according to claim 10, wherein the display information is issue information which includes information of issuer of a function which is performed by the contactless communication by the contactless communication device.

13. The mobile information apparatus according to claim 12, wherein the display means for displaying the display information in said one or more display areas comprises, a means for displaying the issue information which is stored in a second predetermined area in a specified display area of the one or more display areas, on which only a basic processing section for performing a basic function can be displayed.

14. The mobile information apparatus according to claim 10, further comprising:

a wireless communication section for performing a wireless communication with a base station of a mobile communication network.

* * * * *